United States Patent
Kondoh et al.

(10) Patent No.: US 11,524,235 B2
(45) Date of Patent: Dec. 13, 2022

(54) ANIMATION PRODUCTION SYSTEM

(71) Applicant: AniCast RM Inc., Minato-ku (JP)

(72) Inventors: Yoshihito Kondoh, Chuo-ku (JP); Masato Murohashi, Tokyo (JP)

(73) Assignee: ANICAST RM INC., Minato-Ku (JP)

( * ) Notice: Subject to any disclaimer, the term of this patent is extended or adjusted under 35 U.S.C. 154(b) by 0 days.

(21) Appl. No.: 17/008,142

(22) Filed: Aug. 31, 2020

(65) Prior Publication Data
US 2022/0032190 A1  Feb. 3, 2022

(30) Foreign Application Priority Data

Jul. 29, 2020 (JP) .............................. JP2020-128301

(51) Int. Cl.
*A63F 13/63* (2014.01)
*A63F 13/5258* (2014.01)
*A63F 13/60* (2014.01)

(52) U.S. Cl.
CPC .......... *A63F 13/5258* (2014.09); *A63F 13/60* (2014.09); *A63F 13/63* (2014.09); *A63F 2300/609* (2013.01); *A63F 2300/6018* (2013.01); *A63F 2300/64* (2013.01); *A63F 2300/65* (2013.01); *A63F 2300/6607* (2013.01); *A63F 2300/6661* (2013.01)

(58) Field of Classification Search
CPC .... A63F 13/52; A63F 13/525; A63F 13/5255; A63F 13/5258
See application file for complete search history.

(56) References Cited

U.S. PATENT DOCUMENTS

| | | | | |
|---|---|---|---|---|
| 9,361,067 | B1* | 6/2016 | Yano | A63F 13/63 |
| 9,814,987 | B1* | 11/2017 | Lawson | A63F 13/65 |
| 2003/0038805 | A1* | 2/2003 | Wong | A63F 13/12 |
| | | | | 345/473 |
| 2004/0105004 | A1* | 6/2004 | Rui | H04N 7/181 |
| | | | | 348/159 |
| 2007/0120979 | A1* | 5/2007 | Zhang | G08B 13/19667 |
| | | | | 348/154 |
| 2007/0162854 | A1* | 7/2007 | Kikinis | A63F 13/10 |
| | | | | 715/719 |

(Continued)

FOREIGN PATENT DOCUMENTS

| | | | |
|---|---|---|---|
| JP | 07200878 A | * | 8/1995 |
| JP | 2001283259 A | * | 10/2001 |

(Continued)

OTHER PUBLICATIONS

"Team Fortress 2—Recording and Editing Replays," by Jimo, Published May 11, 2013. Source: https://steamcommunity.com/sharedfiles/filedetails/?id=142261059 (Year: 2013).*

(Continued)

*Primary Examiner* — Steven J Hylinski

(57) ABSTRACT

To enable you to take animations in a virtual space, an animation production method comprising: a step of placing a character in a virtual space; a step of placing a virtual camera for shooting the character in the virtual space; a step of acquiring action data defining an action of the character from an external source; a step of operating the character based on the action data; and a step of shooting the action of the character by the camera.

2 Claims, 11 Drawing Sheets

(56) References Cited

U.S. PATENT DOCUMENTS

| | | | | |
|---|---|---|---|---|
| 2008/0125226 | A1* | 5/2008 | Emmerson | A63F 13/335 463/42 |
| 2012/0086631 | A1* | 4/2012 | Osman | A63F 13/213 345/156 |
| 2012/0302341 | A1* | 11/2012 | Abe | A63F 13/87 463/31 |
| 2013/0178257 | A1* | 7/2013 | Langseth | A63F 13/812 463/4 |
| 2017/0061704 | A1* | 3/2017 | Gewicke | G09G 3/003 |
| 2017/0061936 | A1* | 3/2017 | Matsuyama | G09G 5/377 |
| 2017/0157512 | A1* | 6/2017 | Long | A63F 13/86 |
| 2017/0209786 | A1* | 7/2017 | Zhu | A63F 13/92 |
| 2017/0282075 | A1* | 10/2017 | Michot | H04L 67/10 |
| 2018/0214777 | A1* | 8/2018 | Hingorani | A63F 13/46 |
| 2018/0304153 | A1* | 10/2018 | Hohjoh | A63F 13/211 |
| 2018/0356636 | A1* | 12/2018 | Kimura | G02B 27/0176 |
| 2018/0373413 | A1* | 12/2018 | Sawaki | H04N 13/332 |
| 2019/0174109 | A1* | 6/2019 | Yoshikawa | G06T 15/20 |
| 2019/0262726 | A1* | 8/2019 | Spencer | A63F 13/497 |
| 2019/0281194 | A1* | 9/2019 | Mine | H04N 5/2228 |
| 2019/0333261 | A1* | 10/2019 | Nakashima | G06F 3/147 |
| 2020/0210127 | A1* | 7/2020 | Browy | H04L 67/12 |
| 2020/0289934 | A1* | 9/2020 | Azmandian | A63F 13/428 |

FOREIGN PATENT DOCUMENTS

| | | | | |
|---|---|---|---|---|
| JP | 2005049996 A | * | 2/2005 | ........... G06T 19/006 |
| JP | 2010092402 A | * | 4/2010 | |
| JP | 2017146651 A | * | 8/2017 | |
| JP | 2017146651 A | | 8/2017 | |
| JP | 2018089228 A | * | 6/2018 | |
| JP | 2018190335 A | * | 11/2018 | |
| JP | 2018195177 A | * | 12/2018 | ......... G06F 3/04815 |
| JP | 6526898 B1 | * | 6/2019 | |

OTHER PUBLICATIONS

"[Released] Ultimate Replay 2.0—State based replay system," published Jan. 31, 2020. Source: https://forum.unity.com/threads/released-ultimate-replay-2-0-state-based-replay-system.819597/ (Year: 2020).*

"Ultimate Replay 2.0 A simple and effective state-based replay system for Unity," by Trivial Interactive, published 2020. Source: https://trivialinteractive.co.uk/products/documentation/ultimatereplay_20/UserGuide.pdf (Year: 2020).*

* cited by examiner

ANIMATION PRODUCTION SYSTEM

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production method comprising: a step of placing a character in a virtual space; a step of placing a virtual camera for shooting the character in the virtual space; a step of acquiring action data defining an action of the character from an external source; a step of operating the character based on the action data; and a step of shooting the action of the character by the camera.

The other problems disclosed in the present application and the method for solving them are clarified in the sections and drawings of the embodiments of the invention.

Advantageous Effects of Invention

According to the present invention, animations can be captured in a virtual space.

DESCRIPTION OF EMBODIMENTS

Figure 1:
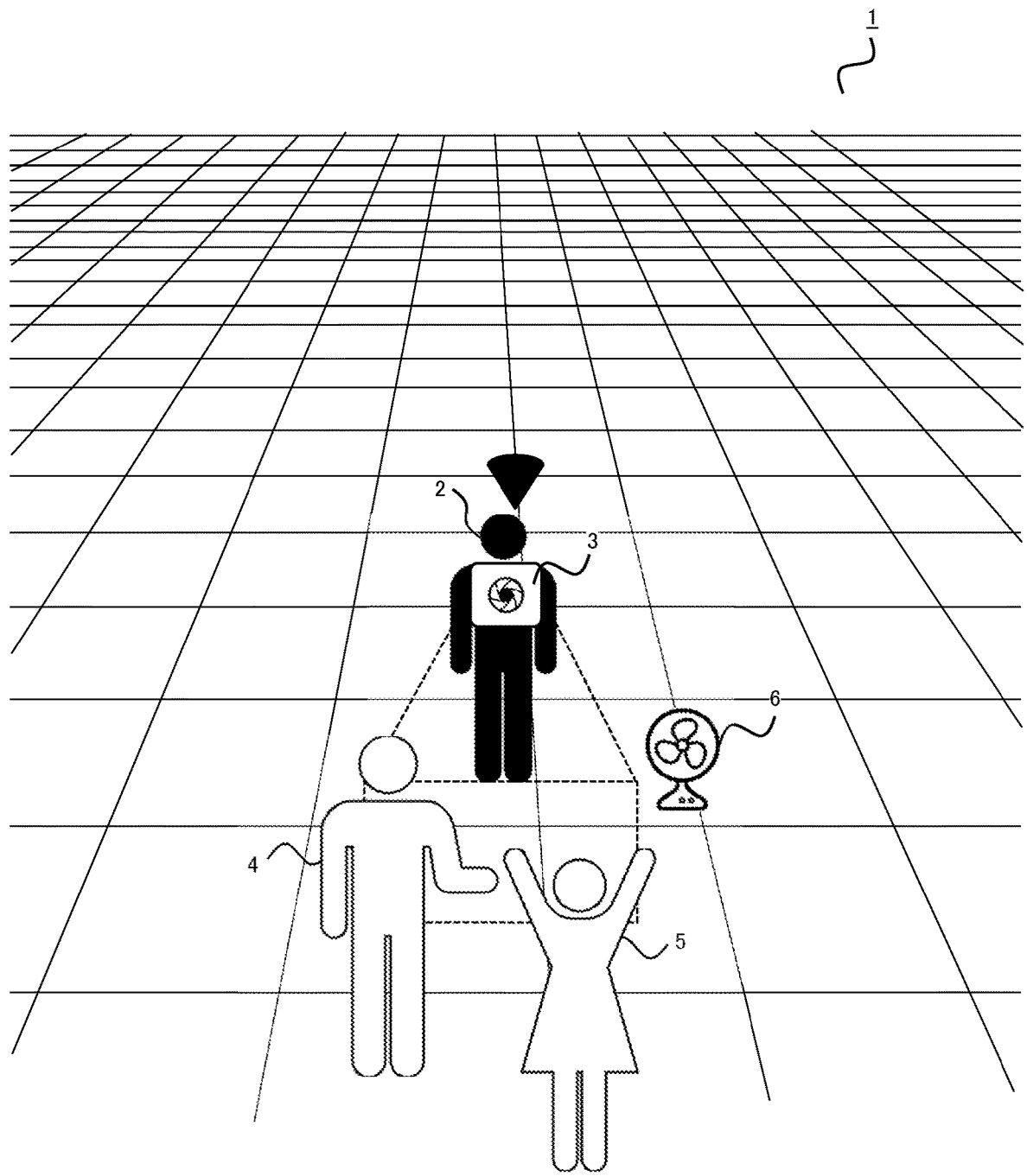
FIG. 1 is a diagram illustrating an example of a virtual space displayed on a head mount display (HMD) mounted by a user in an animation production system of the present embodiment.

The contents of embodiments of the present invention will be described with reference. An animation production method according to an embodiment of the present invention has the following configuration.

Item 1

An animation production method comprising:
a step of placing a character in a virtual space;
a step of placing a virtual camera for shooting the character in the virtual space;
a step of acquiring action data defining an action of the character from an external source;
a step of operating the character based on the action data; and
a step of shooting the action of the character by the camera.

Item 2

The animation production method according to item 1, the method further comprising:
a step of placing an asset store in the virtual space that presents the action data available to the character, wherein:
the step of acquiring the action data from the external source including receiving a designation of the action data in the asset store from the user; and
the step of operating the character including receiving a designation of the character from the user and operating the designated character based on the designated action data.

Item 3

The animation production method according to items 1 or 2, the method further comprising:
a step of editing the action data.

Item 4

The animation production method according to item 3, wherein the step of editing the action data including receiving a designation of a body part of the character from the user, moving the body part in response to an operation from the user, and updating the action data by the movement of the body part that has been moved.

A specific example of an animation production system according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

Overview

FIG. 1 is a diagram illustrating an example of a virtual space displayed on a head mount display (HMD) mounted by a user in an animation production system of the present embodiment. In the animation production system of the present embodiment, a character 4 and a camera 3 are disposed in the virtual space 1, and a character 4 is shot using the camera 3. In the virtual space 1, the photographer 2 is disposed, and the camera 3 is virtually operated by the photographer 2. In the animation production system of the present embodiment, as shown in FIG. 1, a user makes an animation by placing a character 4 and a camera 3 while viewing the virtual space 1 from a bird's perspective with a TPV (Third Person's View), taking a character 4 with an FPV (First Person View; first person support) as a photographer 2, and performing a character 4 with an FPV. In the virtual space 1, a plurality of characters (in the example shown in FIG. 1, a character 4 and a character 5) can be disposed, and the user can perform the performance while possessing a character 4 and a character 5, respectively. That is, in the animation production system of the present embodiment, one can play a number of roles (roles). In addition, since the camera 2 can be virtually operated as the photographer 2, natural camera work can be realized and the representation of the movie to be shot can be enriched.

General Configuration

Figure 2:
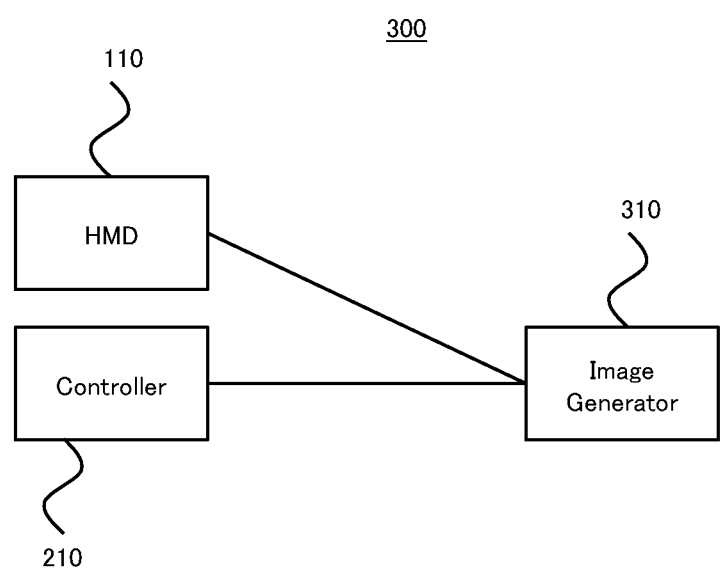
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise, for example, an HMD 110, a controller 210, and an image generating device 310 that functions as a host computer. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function.

HMD110

Figure 3:
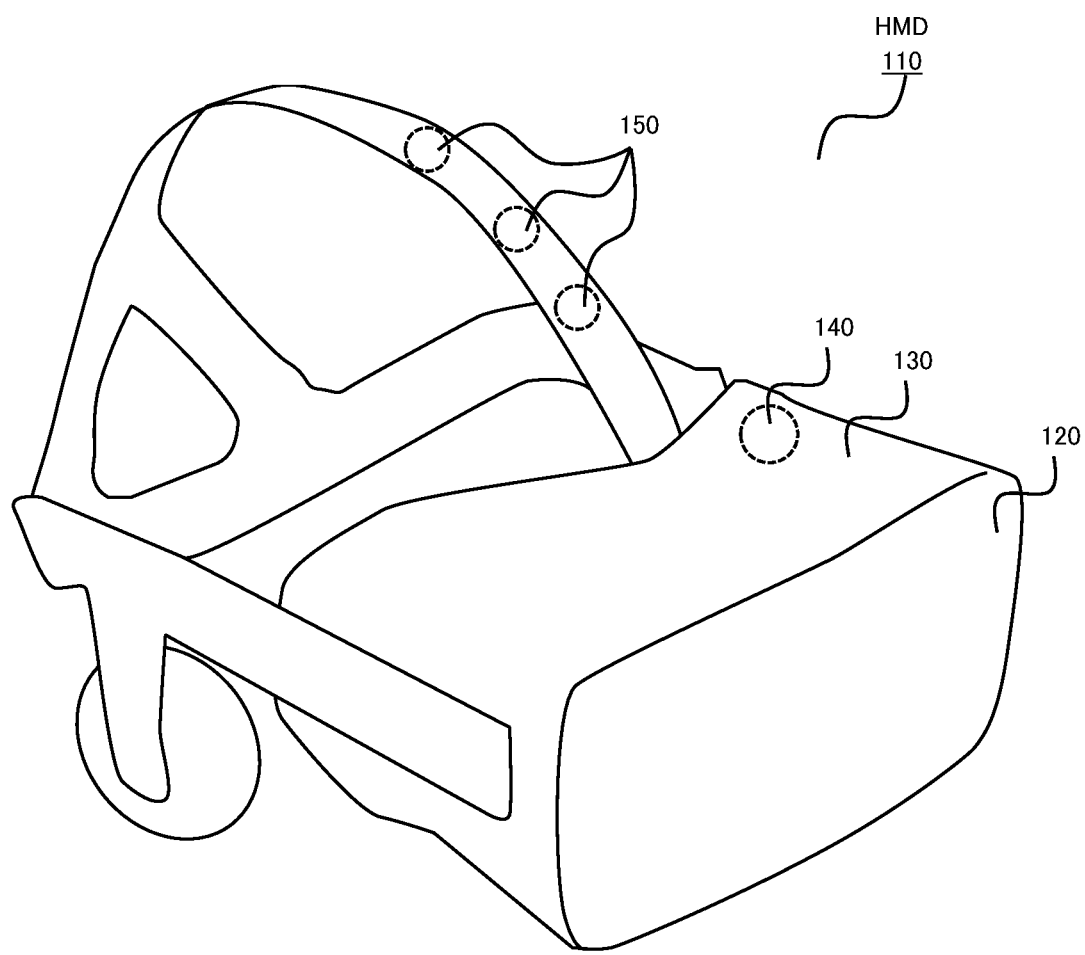
FIG. 3 shows a schematic view of the appearance of a head mount display (hereinafter referred to as an HMD) 110 according to the present embodiment.
Figure 5:
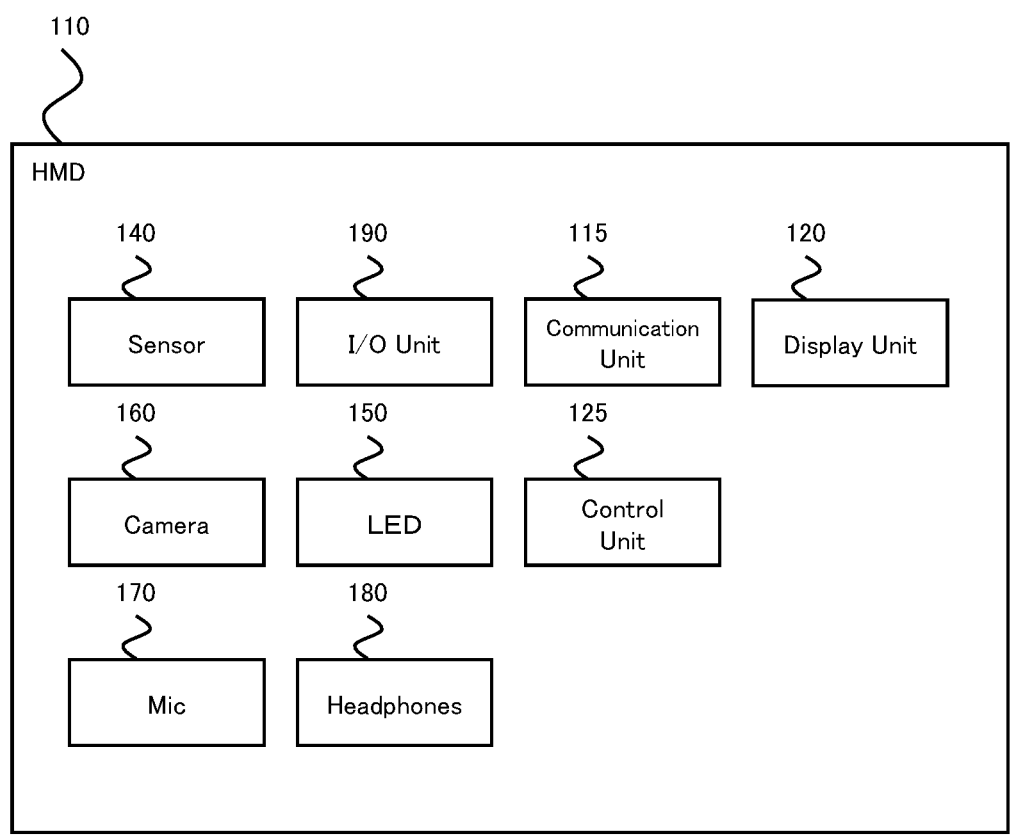
FIG. 5 shows a functional configuration diagram of the HMD 110 according to the present embodiment.

FIG. 3 shows a schematic view of the appearance of a head mount display (hereinafter referred to as HMD) 110 according to the present embodiment. FIG. 5 shows a functional configuration diagram of the HMD 110 according to the present embodiment. The HMD 110 is mounted on the user's head and includes a display panel 120 for placement in front of the user's left and right eyes. Although an optically transmissive and non-transmissive display is con- templated as the display panel, this embodiment illustrates anon-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. The sensor 140 may comprise, for example, a magnetic sensor, an acceleration sensor, or a gyro sensor, or a combination thereof, to detect actions such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

Controller 210

Figure 4:
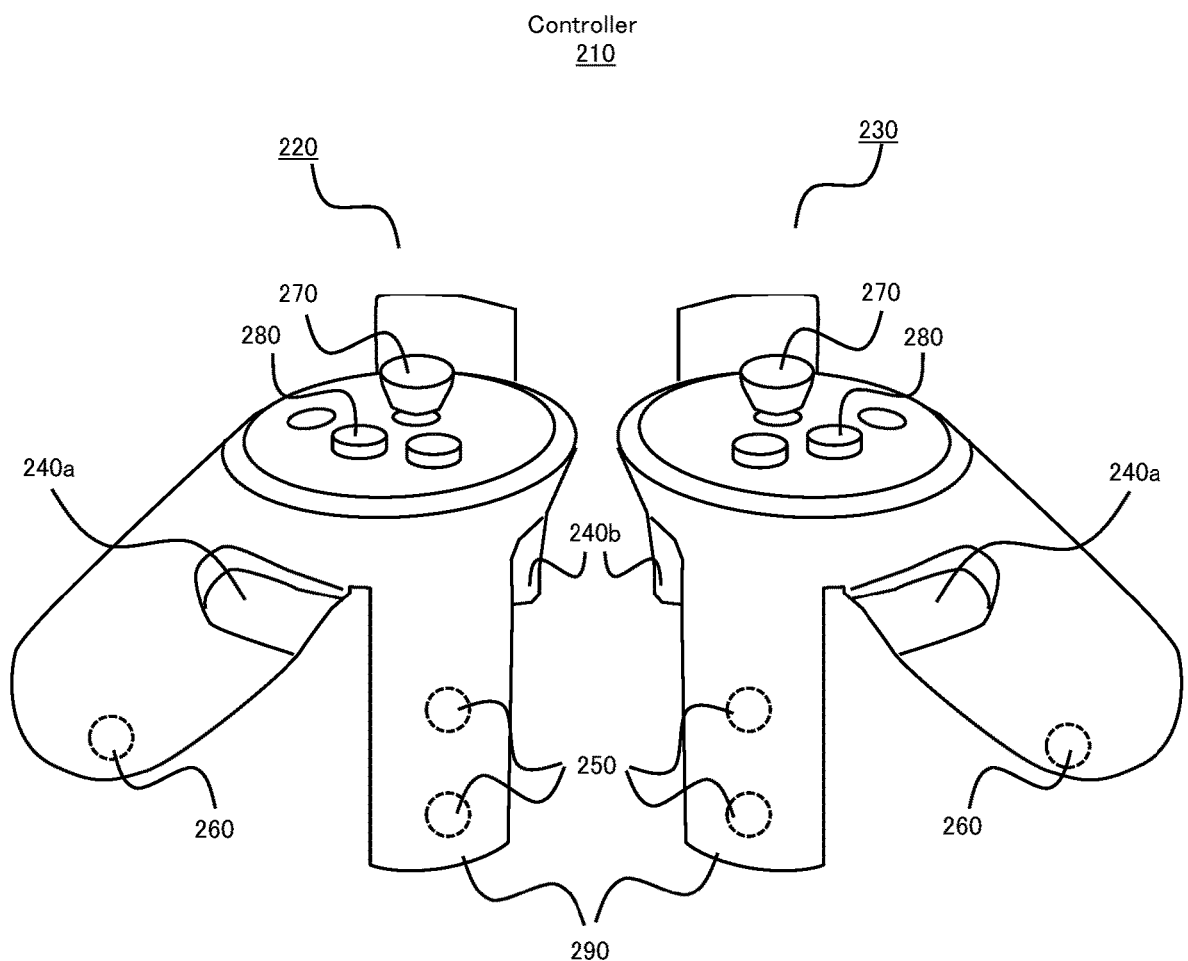
FIG. 4 shows a schematic view of the outside of the controller 210 according to the present embodiment.
Figure 6:
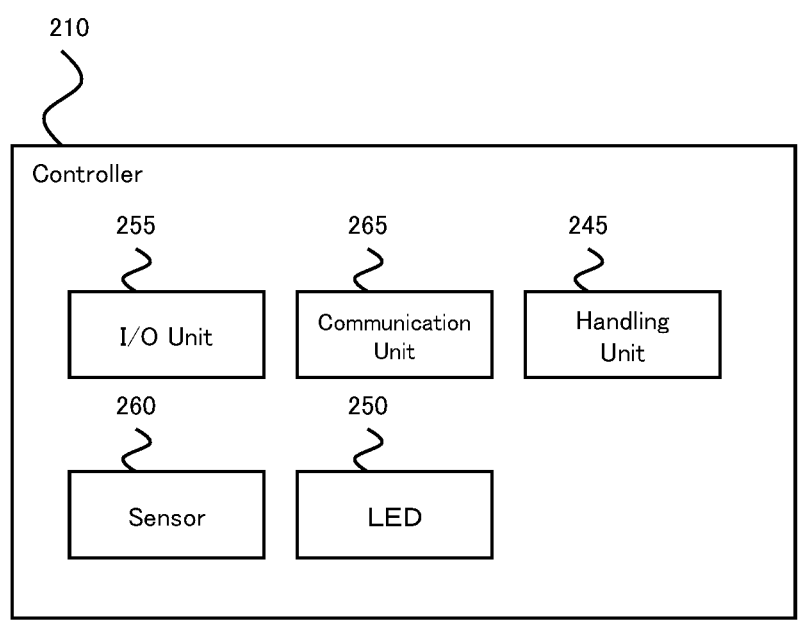
FIG. 6 shows a functional configuration diagram of the controller 210 according to the present embodiment.

FIG. 4 shows a schematic view of the appearance of the controller 210 according to the present embodiment. FIG. 6 shows a functional configuration diagram of the controller 210 according to the present embodiment. The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect operations such as the orientation or tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the user's hand operation and attitude, pseudo-displaying and operating the user's hand in the virtual space.

Image Generator 310

Figure 7:
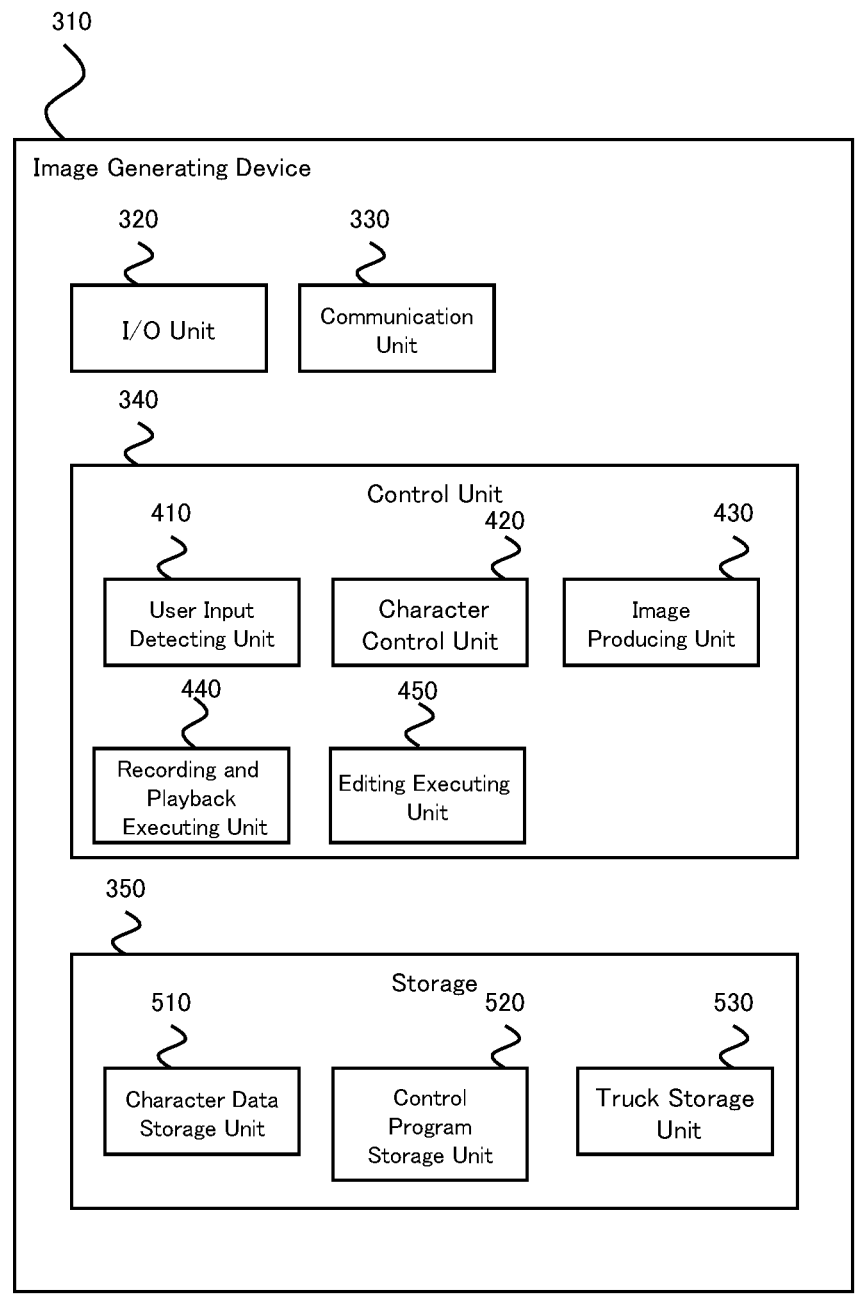
FIG. 7 shows a functional configuration diagram of an image producing device 310 according to the present embodiment.

FIG. 7 shows a functional configuration diagram of an image producing device 310 according to this embodiment. The image producing device 310 may use a device such as a PC, a game machine, or a portable communication terminal having a function for storing information on the user's head operation or the operation or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110 and/or the communication unit 330 regarding the operation of the user's head or the operation or operation of the controller is detected in the control unit 340 as input contents including the operation of the user's position, line of vision, attitude, speech, pronunciation, operation, etc., and a control program stored in the storage unit 350 is executed according to the user's input contents to perform a process such as controlling a character and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the operation of the user's head, the speech and pronunciation of the user, and the operation or operation of the controller, a character control unit 420 that executes a control program stored in the control program storage unit 520 for a character stored in the character data storage unit 510 of the storage unit 350 in advance, and an image producing unit 430 that generates an image based on character control. Here, the control of the operation of the character is realized by converting information such as the direction, inclination, or manual operation of the user head detected through the HMD 110 or the controller 210 into the operation of each part of the bone structure created in accordance with the movement or restriction of the joints of the human body, and applying the operation of the bone structure to the previously stored character data by relating the bone structure. Further, the control unit 340 includes a recording and playback executing unit 440 for recording and playing back an image-generated character on a track, and an editing executing unit 450 for editing each track and generating the final content.

The storage unit 350 includes a character data storage unit 510 for storing not only image data of a character but also information related to a character such as attributes of a character. The control program storage unit 520 stores a program for controlling the operation of a character or an expression in the virtual space. The storage unit 350 includes a track storage unit 530 for storing action data composed of parameters for controlling the movement of a character in a dynamic image generated by the image producing unit 430.

Figure 8:
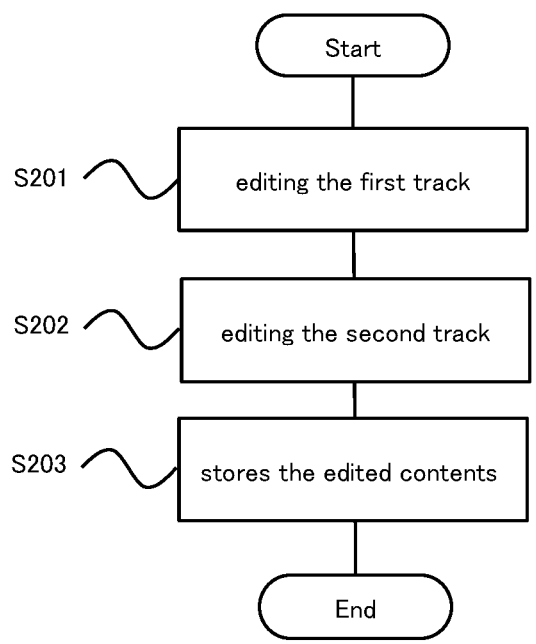
FIG. 8 is a flow chart illustrating an example of a track generation process according to an embodiment of the present invention.

FIG. 8 is a flowchart illustrating an example of a track generation process according to an embodiment of the present invention.

First, the recording and reproduction executing unit 440 of the control unit 340 of the image producing device 310 starts recording for storing action data of the moving image related to operation by the first character in the virtual space in the first track of the track storage unit 530 (S101). Here, the position of the camera where the character is to be shot and the viewpoint of the camera (e.g., FPV, TPV, etc.) can be set. For example, in the virtual space 1 illustrated in FIG. 1, the position where the camera man 2 is disposed and the angle of the camera 3 can be set with respect to the character 4 corresponding to the first character. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. In addition, the recording process may be automatically started based on detecting an operation by a user who performs the character described below.

Subsequently, the user input detecting unit 410 of the control unit 340 detects information received from the HMD 110 and/or the controller 210 relating to the operation of the user's head, speech or pronunciation of the user, and operation or operation of the controller (S102). For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210 or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Subsequently, the character control unit 420 of the control unit 340 controls the operation of the first character in the virtual space based on the operation of the detected user (S103). For example, based on the user detecting an operation to tilt the head, the character control unit 420 controls to tilt the head of the first character. Also, based on the fact that the user lifts the controller and detects pressing a predetermined button on the controller, the character control unit 420 controls something while extending the arm of the first character upward. In this manner, the character control unit 420 controls the first character to perform the corresponding operation each time the user input detecting unit 410 detects an operation by a user transmitted from the HMD 110 or the controller 210. Stores parameters related to the operation and/or operation detected by the user input detecting unit 410 in the first track of the track storage unit 530. Alternatively, the character may be controlled to perform a predetermined performance action without user input, the action data relating to the predetermined performance action may be stored in the first track, or both user action and action data relating to the predetermined behavior may be stored.

Subsequently, the recording and reproduction executing unit 440 confirms whether or not the user receives the instruction to end the recording (S104), and when receiving the instruction to end the recording, completes the recording of the first track related to the first character (S105). The recording and reproduction executing unit 440 continues the recording process unless the user receives an instruction to end the recording. Here, the recording and reproduction executing unit 440 may perform the process of automatically completing the recording when the operation by the user acting as a character is no longer detected. It is also possible to execute the recording termination process at a predetermined time by activating a timer rather than accepting instructions from the user.

Subsequently, the recording and playback executing unit 440 starts recording for storing action data of the moving image associated with operation by the second character in the virtual space in the second track of the track storage unit 530 (S106). Here, the position of the camera where the character is to be shot and the viewpoint of the camera (e.g., FPV, TPV, etc.) can be set. For example, in the virtual space 1 illustrated in FIG. 1, the position where the camera man 2 is disposed and the angle of the camera 3 can be set with respect to the character 5 corresponding to the second character. For example, the user may set the camera viewpoint by the FPV of the character 5, perform the playback processing of the first track, and perform the desired operation by the user who performs the character 5 while checking the operation of the character 4. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. The recording process may also be automatically initiated based on the detection of an action and/or operation by the user performing the characters described below.

Subsequently, the user input detecting unit 410 of the control unit 340 detects information received from the HMD 110 and/or the controller 210 relating to the operation of the user's head, speech or pronunciation of the user, and operation or operation of the controller (S107). Here, the user may be the same user as the user performing the first character, or may be a different user. For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210, shaking the controller 210 left or right, or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Subsequently, the character control unit 420 of the control unit 340 controls the operation of the second character in the virtual space based on the operation of the detected user (S108). For example, based on the user detecting an operation to tilt the head, the character control unit 420 controls to tilt the head of the second character. The character control unit 420 also controls the opening of the finger (i.e. "by") by shaking the arm of the second character, based on the fact that the user has raised the controller to the right and left or pressed a predetermined button on the controller. In this manner, the character control unit 420 controls the second character to perform the corresponding operation each time the user input detecting unit 410 detects an operation by a user transmitted from the HMD 110 or the controller 210. The parameters related to the operation and/or operation detected by the user input detecting unit 410 are stored in the second track of the track storage unit 530. Alternatively, the character may be controlled to perform a predetermined performance action without user input, the action data relating to the predetermined performance action may be stored in a second track, or both user action and action data relating to a predetermined operation may be stored.

Subsequently, the recording and reproduction executing unit 440 confirms whether or not the user receives the instruction to end the recording (S109), and when the instruction to terminate the recording is received, the recording of the second track related to the second character is completed (S110). The recording and reproduction executing unit 440 continues the recording process unless the user receives an instruction to end the recording. Here, the recording and reproduction executing unit 440 may perform the process of automatically completing the recording when the operation by the user acting as a character is no longer detected.

Figure 9:
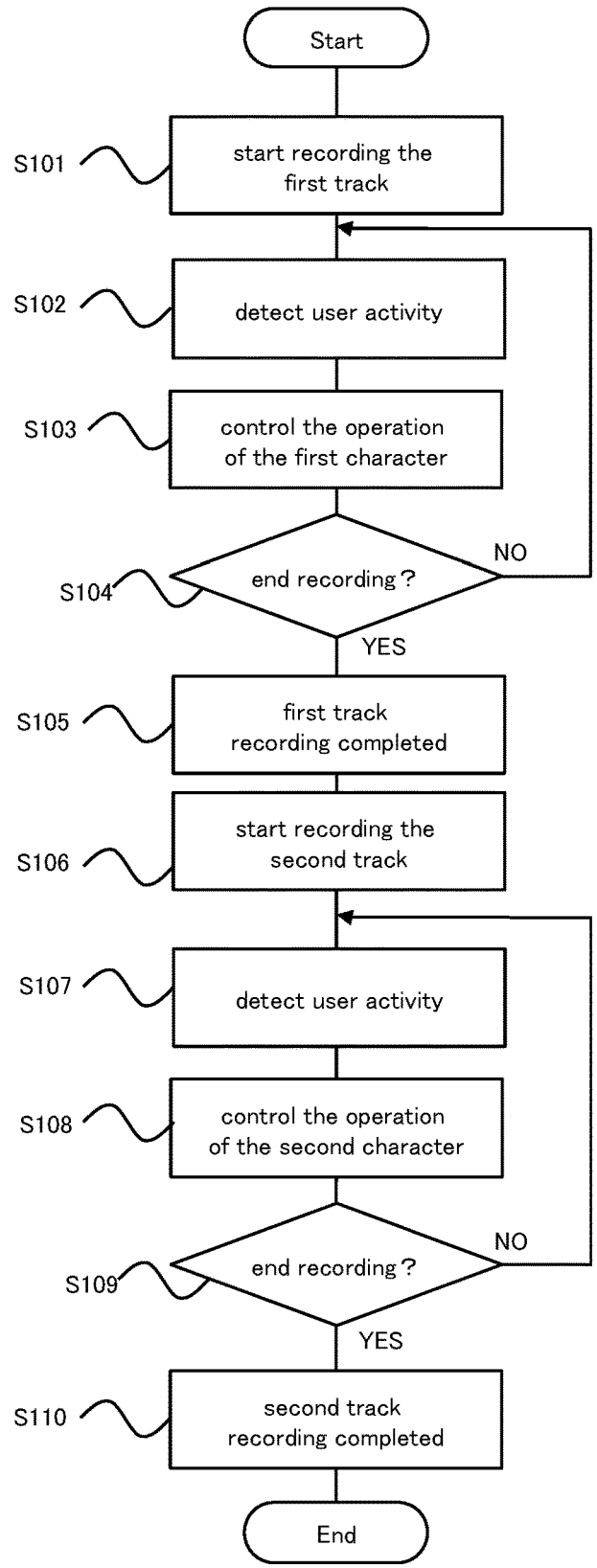
FIG. 9 is a flowchart illustrating an example of a track editing process according to an embodiment of the present invention.

FIG. 9 is a flowchart illustrating an example of a track editing process according to an embodiment of the present invention.

Figure 10:
FIG. 10(a) is a diagram illustrating an example of a user interface for editing a track according to an embodiment of the present invention.
FIG. 10(b) is a diagram illustrating an example of a user interface for editing a track according to an embodiment of the present invention.
Figure 10:

First, the editing execution unit 450 of the control unit 340 of the image generating device 310 performs a process of editing the first track stored in the track storage unit 530 (S201). For example, the user edits a first track (T1) associated with the first character via a user interface for track editing, as shown in FIG. 10*a*. For example, the user interface displays the area in which the first track is stored along a time series. The user selects a desired bar so that the 3D model of the character is rendered based on the parameters and character data of the stored moving image, and the moving image of the character (e.g., the character 4) disposed in the virtual space as shown in FIG. 1 is reproduced. It should be noted that as a user interface for editing tracks, it is also possible to display, for example, a track name and title (e.g., a "first character") in a list format, in addition to the display described above. Alternatively, the user interface may allow editing to be performed while the moving image of the character is played directly, or a keyframe of the moving image may be displayed in which the user selects the keyframe to be edited, without showing the tracks or lists as shown in FIG. 10. In addition, among the 3D characters displayed as a dynamic image, it is possible to perform a process such as changing the color of the character selected as an editing target by the selected time.

As an editing process, for example, in FIG. 1, it is contemplated that the placement position of the character 4 corresponding to the first character is changed in the virtual space 1, the shooting position and angle of the character 4 is changed, and the shooting viewpoint (FPV, TPV) is changed. It is also possible to change or delete the time scale.

Alternatively, a portion of the operation of the character 4 may be changed as an editing process. For example, for a first character played back in a track (T1), a user may specify a part of the body to be edited and only operate the specified part by operation using the controller 210 or the HMD 110. For example, a user may specify an arm of a first character to manipulate only the arm of the first character by the operation of controller 210 while playing back the operation of the first character to modify the movement of the arm.

Next, the editing execution unit 450 performs the process of editing the second track stored in the track storage unit 530 (S202). For example, the user selects the option (not shown) to edit a second track (T2) associated with the second character via a user interface for track editing, and places a bar, via a user interface, as shown in FIG. 10b, indicating the area in which the second track is stored along a time series. As shown in FIG. 10b, the user can adjust the second track relatively, such as synchronizing the playback timing of each track while editing the second track independently of the first track. Similarly, the user may edit other tracks (e.g., a third track (T3)).

As an editing process, for example, in FIG. 1, it is contemplated that the placement position of the character 5 corresponding to the second character is changed in the virtual space 1, the shooting position and angle of the character 5 is changed, and the shooting viewpoint (FPV, TPV) is changed. It is also possible to change or delete the time scale. Here, as an editing process, the user may change the placement position of the second character 5 in the virtual space 1 opposite the character 4 corresponding to the first character.

Further, by playing back each track as an editing process, an animated moving image that is realized in a virtual space as a whole can be created by playing an active image including the operation of a character corresponding to each track in a virtual space. In addition, by playing back each track, it is possible to edit animated moving images that can even be realized in a virtual space by not only reproducing the movement of the character, but also changing the set of the background of the character, increasing or decreasing the object head containing the character, changing the setting of writing, changing the clothing of the character or attaching an accessory, changing the wind amount or direction of the character, and changing the character as is the action data.

After the editing process is completed, the editing execution unit 450 stores the edited contents in response to a user's request or automatically (S203).

The editing process of S201 and S202 can be performed in any order, and can be moved back and forth. The storage processing of S203 can also be performed each time the editing of S201 and S202 is performed. Editing can also be terminated by editing S201 only.

As described above, by applying the method of multitrack recording (MTR) to the animation production according to the present embodiment, the character operation linked to the user operation can be stored in each track, and the animation production can be realized easily and efficiently by performing editing work within each track or between each track.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in this embodiment, while a character has been described as an example with respect to a track generation method and an editing method, the method disclosed in this embodiment may be applied to an object (vehicle, structure, article, etc.) comprising an action, including not only a character, but also a character.

For example, although the image producing device 310 has been described in this embodiment as separate from the HMD 110, the HMD 110 may include all or part of the configuration and functions provided by the image producing device 310.

In the present exemplary embodiment, the action data representing the movement of the character is managed by the association with the character in which the operation was performed. However, the action data may be stored in the storage unit 350 as a movement such as a joint or a bone independent of the character. In this case, the editing execution unit 450 may accept the designation of the action data stored in the storage unit 350 and the designation of the characters 4 and 5 and apply the specified action to the specified characters 4 and 5 to record the specified action in the track.

In the present embodiment, the action data representing the movement of the character is created by the user acting while possessing the characters 4 and 5. However, the action data created by other users can also be used. For example, the editing execution unit 450 may acquire the action data by accessing another computer and register the acquired action data in the character data storage unit 510 as the action data of the characters 4 and 5. The action data can be configured with parameters that control the movement of the character in the moving image, as described above, and can represent, for example, bone, joint rotation or movement. The recording and reproduction executing unit 440 may operate the characters 4 and 5 based on the action data, even if the action data is obtained from another computer. In addition, the editing execution unit 450 may edit the operation of only a part of the body with respect to a character to which the acquired action data is applied. For example, as described above, the editing execution unit 450 may designate the body part to be edited, and only the operation of the specified part may be operated by operation using the controller 210 or the HMD 110.

Figure 11:
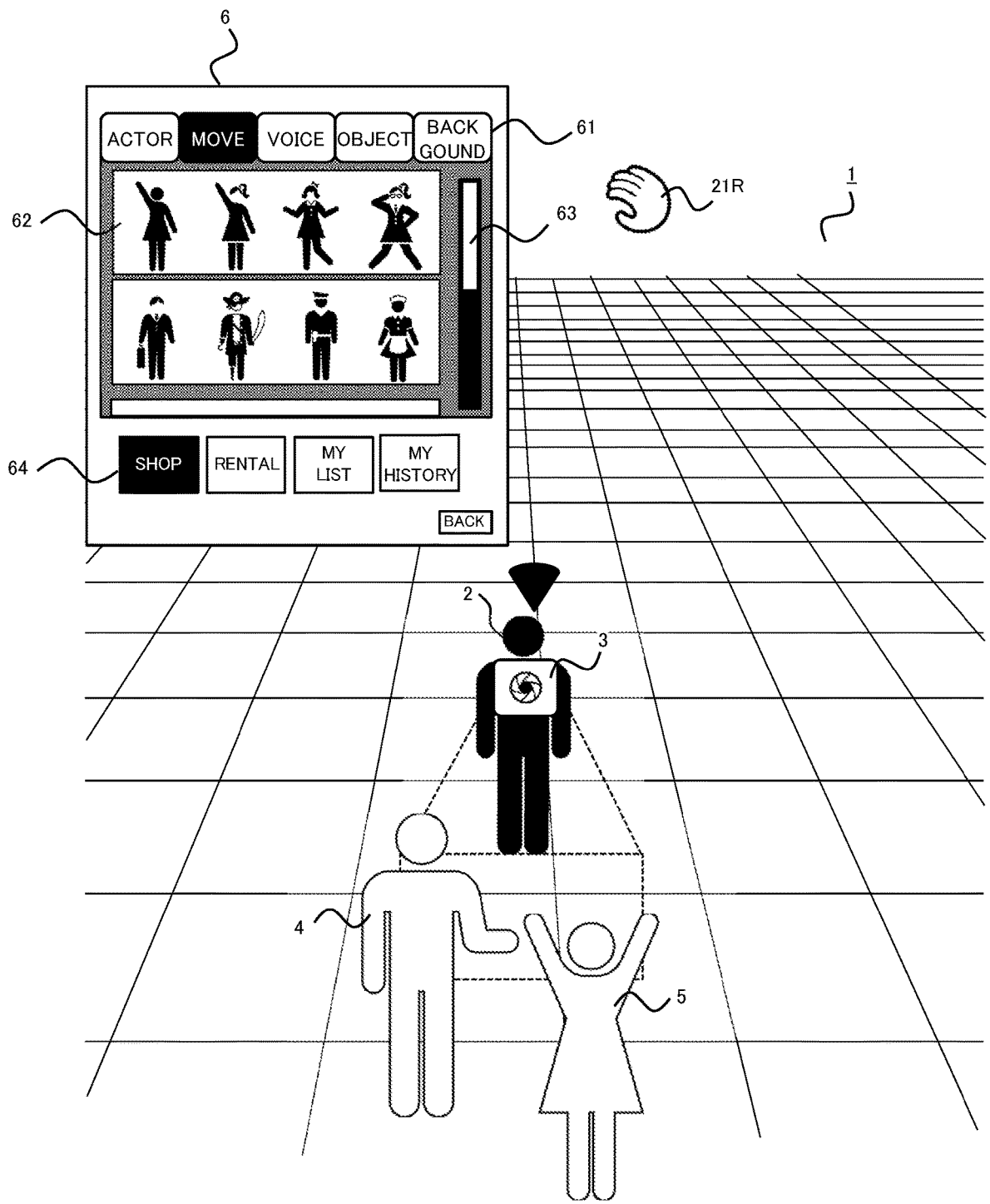
FIG. 11 is a diagram illustrating an operation of purchasing or renting action data as an asset.

As an asset in virtual space 1, action data can also be sold or rented. FIG. 11 is a diagram illustrating an operation of purchasing or renting action data as an asset. The user opens the asset list 6 on the virtual space 1 and selects a character to be disposed, for example, as a character 4-3. The asset list 6 includes an asset type tab 61, an asset item 62, a scroll bar 63, and a button 64.

The asset type tab 61 may be, for example, a 3DCG model (ACTOR) of the character 4, action data (MOVE) of the character 4, voice quality or specific serifs (VOICE) when possessed by the character 4, an object (OBJECT) arrangable in the virtual space 1, or a background (BACKGROUND) arrangable in the virtual space 1. In addition, the 3DCG model of the character 4 may have a particular operation in advance.

The asset item 62 is modified according to the selection of the asset type tab 61 to display a list corresponding to each type of asset. The items displayed in this list may be data obtained from a server connected via a network such as a cloud server, for example. In FIG. 8, a list of the 3DCG models of the purchaseable character 44 is illustrated and, as an example, the facial image and name are represented in each item, but not limited thereto, for example, the amount, setting age, and the like may be represented, or the 3DCG model may be represented as is, as shown in FIG. 11. In addition, when there are many display items, for example, a scroll bar 63 may be slid to allow all items to be identified, a sort such as the order of sounds or the order of amounts may be possible, or a user's preferences may be learned based on the sales and rental history to preferentially display the asset in accordance with the user's preferences. Each item may be sold not only as a single asset but also as a set of assets of the same or different asset types.

Buttons 64 can be arranged for a variety of applications, and in FIG. 8 an example is an asset purchase button (SHOP), an asset rental button (RENTAL), a holding asset list (MY LIST), an asset purchase and/or rental history (MY HISTORY), and a button (BACK) that returns to the previous window display.

The user can apply the action data to the character by grasping the action data 62 by the virtual right hand 21R in the virtual space 1 and releasing the action data 62 on the characters 4 and 5 to which the action data 62 is applied.

For example, after confirming the content of the item data 7, the purchase procedure may be performed by pressing the purchase decision button (BUY) on the item data 7 or the button to which the decision operation of the controller 210 has been assigned. Rental may also be substantially similar, except that the use period after payment is limited.

It is also possible to register the assets created by the producer in the asset list (MY LIST). The created assets can then be sold and/or rented for a fee or free to other unspecified number of users or designated users, and may be displayed in an assortment list of other users.

EXPLANATION OF SYMBOLS 1 virtual space
2 cameraman
3 cameras
4 characters
5 characters
110 HMD
210 controller
310 Image Generator

The invention claimed is:

1. An animation production method comprising:
   a step of placing a character in a virtual space;
   a step of placing a virtual camera for shooting the character in the virtual space;
   a step of acquiring action data defining an action of the character from an external source;
   a step of replaying the action data, wherein a movement of the character is controlled based on the action data; and
   a step of editing the action data, the step of editing the action data including receiving a designation of a body part of the character from the user, moving the body part in response to an operation from the user, and updating the action data by the movement of the body part that has been moved while replaying the action data;
   a step of shooting the action of the character by the camera.

2. The animation production method according to claim 1, the method further comprising:
   a step of placing an asset store in the virtual space that presents the action data available to the character, wherein:
   the step of acquiring the action data from the external source including receiving a designation of the action data in the asset store from the user; and
   the step of operating the character including receiving a designation of the character from the user and operating the designated character based on the designated action data.

* * * * *